(12) United States Patent
Mandolini et al.

(10) Patent No.: US 9,141,999 B2
(45) Date of Patent: Sep. 22, 2015

(54) ELECTRONIC FLOOR PLAN SERVER AND METHOD

(75) Inventors: James V. Mandolini, Tucson, AZ (US); David N. Golf, Tuscon, AZ (US)

(73) Assignee: Floor Plans First, LLC, Tucson, AZ (US)

( * ) Notice: Subject to any disclaimer, the term of this patent is extended or adjusted under 35 U.S.C. 154(b) by 0 days.

(21) Appl. No.: 12/249,516

(22) Filed: Oct. 10, 2008

(65) Prior Publication Data

US 2009/0105994 A1   Apr. 23, 2009

Related U.S. Application Data

(60) Provisional application No. 60/979,726, filed on Oct. 12, 2007.

(51) Int. Cl.
*G06F 17/50* (2006.01)
*G06Q 50/16* (2012.01)
*G06Q 50/08* (2012.01)

(52) U.S. Cl.
CPC ............... *G06Q 50/16* (2013.01); *G06Q 50/08* (2013.01)

(58) Field of Classification Search
CPC ............................... G06Q 50/16; G06Q 50/08
USPC .............................................. 703/1; 715/788
See application file for complete search history.

(56) References Cited

U.S. PATENT DOCUMENTS

| | | | |
|---|---|---|---|
| 5,668,736 A * | 9/1997 | Douglas et al. ................... 703/1 |
| 6,912,293 B1 * | 6/2005 | Korobkin ...................... 382/100 |
| 7,062,722 B1 * | 6/2006 | Carlin et al. .................. 715/850 |
| 2002/0032546 A1 * | 3/2002 | Imamura et al. .................. 703/1 |
| 2002/0052755 A1 * | 5/2002 | Whatley et al. .................... 705/1 |
| 2004/0041812 A1 * | 3/2004 | Roberts et al. ................ 345/474 |
| 2005/0015312 A1 * | 1/2005 | Hoffman et al. ................ 705/27 |
| 2005/0028094 A1 * | 2/2005 | Allyn ............................ 715/526 |
| 2005/0081161 A1 * | 4/2005 | MacInnes et al. ............ 715/765 |
| 2005/0273354 A1 * | 12/2005 | Adams .............................. 705/1 |

* cited by examiner

*Primary Examiner* — Dwin M Craig

(57) ABSTRACT

A new and useful concept in electronic presentation and operation with a floor plan is provided, that is designed to enhance the ability of a buyer/renter to view or otherwise understand many of the attributes of a building A user (e.g. a building buyer/renter or prospective building buyer/renter) is enabled to access, and work with a floor plan that is electronically stored at a floor plan server, via interaction between the floor plan server and a client that can be placed in circuit communication with the floor plan server (e.g. over the interne via a web browser). The user is enabled to (a) electronically work with the selected floor plan to produce a modified floor plan, and (b) save an instance of the modified floor plan at the floor plan server so that the user (or someone to whom the user emails a link to the saved instance) can revisit and work with the saved instance.

2 Claims, 4 Drawing Sheets

DataBase Relations Diagram

Each floorplan in the database can have multiple instances, and each instance can have multiple pieces of furniture. Camera icons, which launch photos, are treated as pieces of furniture with a file name in the fileName field.

The floorplan

FloorPlans

| Column Name | Condensed Type | Nullable | Identity | Default Value |
|---|---|---|---|---|
| Search_ID | int | NOT NULL | ✓ | |
| layout | int | NULL | | (0) |
| MLS | nvarchar(50) | NULL | | |
| Address | nvarchar(255) | NULL | | |
| City | nvarchar(255) | NULL | | |
| State | nvarchar(255) | NULL | | |
| Zip | nvarchar(255) | NULL | | |
| district_id | int | NULL | | (0) |
| district | nvarchar(255) | NULL | | |
| image | nvarchar(255) | NULL | | |
| imagethumb | nvarchar(255) | NULL | | |
| dateadded | datetime | NULL | | (getdate()) |
| lastedited | datetime | NULL | | (getdate()) |
| Swf_Url | text | NULL | | |
| scale | float(53) | NOT NULL | | (0.0) |
| active | bit | NULL | | (1) |

The furniture referenced to the floorplan instance floorplan_Ui_Furniture

| Column Name | Condensed Type | Nullable | Identity | Default Value |
|---|---|---|---|---|
| FpUiFurniture_Id | int | NOT NULL | ✓ | |
| FpUi_Id | int | NOT NULL | | |
| X_position | int | NOT NULL | | (0) |
| Y_position | int | NOT NULL | | (0) |
| Rotation_Position | int | NOT NULL | | (0) |
| FurnitureId | int | NOT NULL | | (0) |
| FurnitureName | varchar(128) | NOT NULL | | |
| fileName | varchar(1024) | NULL | | |

The floorplan instance floorplan_user_instance

| Column Name | Condensed Type | Nullable | Identity | Default Value |
|---|---|---|---|---|
| FpUi_Id | int | NOT NULL | ✓ | |
| Last_Edited | datetime | NOT NULL | | (0-0-0) |
| Search_Id | int | NOT NULL | | (0) |
| active | bit | NULL | | (1) |

Figure 4

ELECTRONIC FLOOR PLAN SERVER AND METHOD

RELATED APPLICATION/CLAIM OF PRIORITY

This application is related to and claims priority from provisional application Ser. No. 60/979,726, filed Oct. 12, 2007, which provisional application is incorporated by reference herein.

BACKGROUND

The present invention relates to a new and useful floor plan server, client and method that enables a building buyer/renter (or prospective building buyer/renter) to preview a building, on line, and to enable the buyer/renter to customize a floor plan in various ways, on line, before touring the building in person. More specifically, the present invention provides a new and useful floor plan server, client and method that have several new and useful features; e.g. the present invention enables a user, (e.g. a building buyer/renter or prospective building buyer/renter) to select a floor plan for a building, to view aspects of the building in ways that help the buyer understand the building, and enable the buyer/renter to create a customized version of a selected floor plan, on line, transmit a link to the customized version to a selected address, so that the buyer/renter, or someone the buyer/renter is working with, can access the buyer's customized version, and modify the buyer's customized version.

When a real estate agent is showing a building to a prospective buyer, it is often useful and desirable for the real estate agent to show the prospective buyer a floor plan of the building. In addition, in the applicants' experience, it is also useful to be able to show the floor plan to the prospective buyer, on line, before the buyer/renter actually tours the building, so that the prospective buyer/renter can access the floor plan on line, and view the floor plan at the buyer/renter's convenience, without the real estate agent having to physically deliver a hard copy of the floor plan to the buyer/renter. Moreover, in the applicants' experience, it is also useful to provide the types of viewing and customization opportunities provided by the present invention to a buyer/renter, on line, before the buyer/renter actually tours the building, so that the buyer/renter can fully, efficiently and effectively explore the building, and its attributes before the buyer/renter decides whether to tour the building.

In addition, in the applicants' experience, a floor plan server, client and method that provides various additional features, of the type provided by the present invention, on line, can enhance the ability of the real estate agent to interest a buyer/renter in a building.

SUMMARY OF THE INVENTION

The present invention provides a new and useful concept in electronic presentation and operation with a floor plan, in a manner designed to enhance the ability of a buyer/renter to view, work with, or otherwise understand many of the attributes of a building, on line. More specifically, the present invention enables a user (e.g. a building buyer/renter or prospective building buyer/renter) to access, and work with a floor plan that is electronically stored at a floor plan server, via interaction between the floor plan server and a client that can be placed in circuit communication with the floor plan server (e.g. over the internet via a web browser).

In one of its broadest aspects, the invention enables a user to (a) electronically work with the selected floor plan to produce a modified floor plan, and (b) save an instance of the modified floor plan at the floor plan server so that the user (or someone to whom the user emails a link to the saved instance) can revisit the saved instance.

Additionally, in its preferred form, this aspect of the invention enables a user to electronically work with a selected floor plan by selecting at least one furniture item for a room of the selected floor plan, and placing the furniture item in the room in a selected orientation in the room as part of the saved instance at the floor plan server. Furthermore, the user can rotate a selected furniture item to a selected rotational orientation in a room and save the selected furniture item in the selected rotational orientation as part of the saved instance at the floor plan server.

Also, according to a preferred form of the present invention, the floor plan and all furniture items available for selection and combination with the floor plan at the floor plan server are configured to be in a predetermined scaled relationship to each other when presented at a client, such that whenever a furniture item is selected for a room of the floor plan, the furniture item will be presented at a client in the predetermined scaled relationship to the floor plan.

Still further, according to a preferred aspect of the present invention, a user can electronically transmit a link to an instance of the modified floor plan (that is saved at the floor plan server) to an address selected by the user. This aspect also allows a subsequent user to (a) access, via the transmitted link, the instance of the modified floor plan at the floor plan server, (b) work with the modified floor plan via circuit communication between a client and the floor plan server to enable any or all of (i) production of a further modification of the modified floor plan via the client, (ii) replacement of the instance of the modified floor plan with the further modification at the floor plan server, and (iii) electronic transmission of a link to the modified instance at the electronic floor plan server to an address selected by the subsequent user. Also, a user or subsequent user is enabled to format a selected floor plan to fit up to the entire screen of a client, and to zoom in or out of a selected area of the floor plan, independently of the capability of the user to work with the selected floor plan.

In another of its broad aspects, the present invention enables a user to (a) select a floor plan that is configured such that a user is provided with a symbol of the orientation from which an image associated with a room of the selected floor plan can be accessed and viewed, and (b) electrically work with the selected floor plan by maneuvering the accessed image to any location over the entire screen of a client. Thus, a user can view images of the building associated with the floor plan, from the orientation shown in the floor plan. However, once an image has been opened, it can be maneuvered anywhere over the entire screen of the client, so that a user can quickly and efficiently move the image to any orientation, when the user wants to switch back to the floor plan. In addition, the user is enabled to change the size of the image, format the floor plan to fit the entire screen of a client, and to zoom in or out of a selected area of the floor plan, independently of the capability of the user to maneuver a selected image over the entire screen of the client. Thus, if a user has a photo open, but wants to zoom in or out of an area of the floor plan, the photo being open does not impede the user from zooming in or out of the area of the floor plan.

Other features of the present invention will become further apparent from the following detailed description and the accompanying drawings.

BRIEF DESCRIPTION OF THE DRAWINGS

FIG. 4 is a diagram illustrating how certain relationships are configured in a database, to enable floor plans, saved instances of a floor plan, or a modified floor plan, to be stored in the floor plan server database.

DETAILED DESCRIPTION

As discussed above, the present invention relates to a new and useful floor plan server, client and method that enable a user (e.g. a building buyer/renter or prospective building buyer/renter) to access, and work with a floor plan that is electronically stored at the floor plan server, via interaction between the floor plan server and a client that can be placed in circuit communication with the floor plan server (e.g. over the internet via a web browser). The principles of the invention are described herein in connection with one exemplary embodiment of a floor plan server and method, and from that description the manner in which the principles of the invention can be implemented with various floor plan servers and methods will be apparent to those in the art.

Initially, it is believed useful to define some terms that are used in this application. A "floor plan server" is a repository for data and software that can be served to a client when the client is in circuit communication with the server; where the data includes one or more floor plans, one or more furniture items that can be electronically dragged and dropped into a floor plan, and can optionally include additional materials such as one or more photographs or other images and/or data in any form that can be electronically associated with a floor plan. A "client" is any device that can be placed in circuit communication with a floor plan server, including an internet browser, PDA, phone, etc. A client being in "circuit communication" with a floor plan server means that the client is in communication with the floor plan server by a wired connection, a wireless connection, or any other form of connection that includes electronic, optical or any other means of transmitting a data stream between the client and the floor plan server. Reference to "furniture" or to a "furniture item" includes not only typical room furniture (e.g. couch, chair, table, etc), but also includes objects such as pools, vehicles, outdoor umbrellas, spas, landscape objects, etc, that would typically be associated with a building, and whose location and/or orientation relative to a floor plan for a building would be of interest to a user desiring to fully explore a floor plan.

Figure 1:
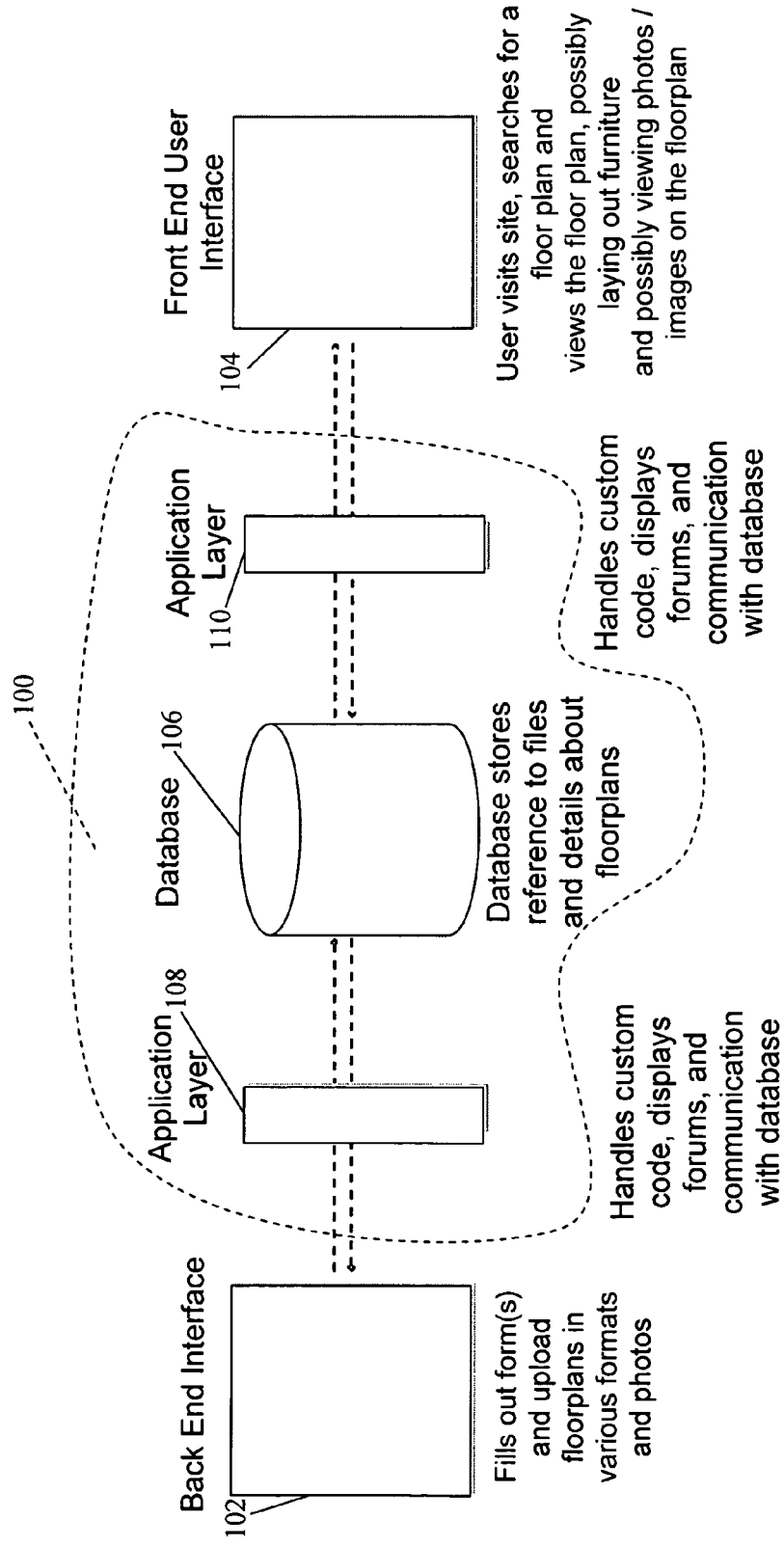
FIG. 1 is a schematic overview of a floor plan server and method for implementing the principles of the present invention.

FIG. 1 shows an overview of the major components of a system for implementing the principles of the present invention. The system includes a floor plan server 100, a back end interface 102 by which data is entered into the floor plan server 100, and a front end interface through which a user can interface with the floor plan server 100 (via a client). In this application, reference to a user interfacing with the floor plan server 100 will be described in the context of a user that interfaces with the floor plan server 100 via circuit communication (e.g. over the internet) between a client (e.g. a web browser) and the floor plan server 100.

The server 100 is preferably an MS SQL Server/MS Internet Information server that is able to deliver compiled Flash (Adobe), and a Cold Fusion environment, and is also configured as a MS SQL editor, and as an MS SQL enterprise manager.

In the system shown in FIG. 1, the floor plan server 100 includes a database 106, and a pair of application layers 108, 110. The application layer 108 enables interaction with the floor plan server 100 via the back end interface 102 (which is a back end client to the server). The application layer 110 enables interaction between a user and the floor plan server 100, via the front end interface 104 (which is a front end client to the server).

Figure 2:
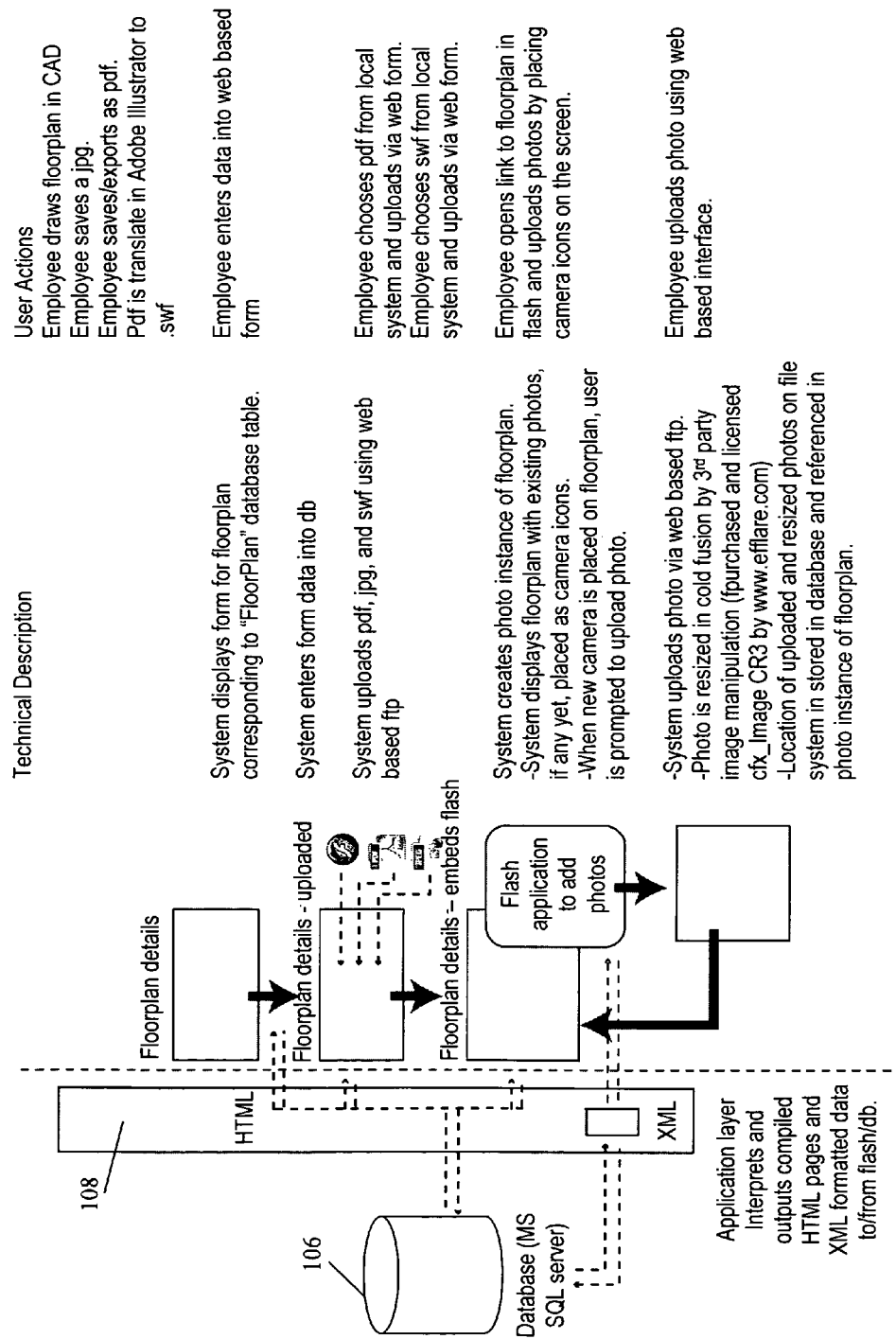
FIG. 2 is a schematic illustration of the way the principles of the present invention are implemented at the back end of the floor plan server, showing the actions that can be taken to set up or modify the floor plan server, and the manner in which those actions are implemented.

Referring first to the schematic of FIG. 2, in order to implement the principles of the present invention, the floor plan server 100 would typically have a collection of building floor plans stored therein. A floor plan would be initially drawn in a CAD program, and then initially saved as a jpg file. Then, the floor plan is exported and saved to the floor plan server as a pdf (Adobe) file. The pdf is then translated by Adobe Illustrator to a swf (Flash) file.

A floor plan is then entered into the database 106, by filling out a floor plan form table of the type shown in FIG. 4. The system then uploads the pdf, jpg and swf files of the floor plan, via the back end application layer 108, using a web based file transfer protocol (ftp). Thus, the floor plan is stored in the database 106 in various file formats that enable the database to be interfaced with a user, via the front end interface 104, over the internet, in the manner described below.

One aspect of the present invention relates to the way photos of a building are handled in connection with a floor plan. If a building seller/lessor wants photos of the building to be displayed when a floor plan is being displayed to a buyer, the seller/lessor provides the photos that the seller/lessor wants displayed. When a photo is being entered to the floor plan server 100, a link to the floor plan is opened, via the back end interface 102, as an swf (Flash) file (Adobe), so that the swf file of the floor plan is displayed and the photo is uploaded to the floor plan server 100 by placing a camera ion on the floor plan screen (via the back end interface 102), with the camera icon showing the orientation from which the photo image will be viewed by a user. The system is enabled, via back end application layer 108, to create a photo instance of the floor plan in Flash (or access an existing photo instance of the floor plan), to display the photo instance of the floor plan with the orientation of any existing photos (that are stored as jpg files) represented by camera icons, and enables a new camera icon to be placed on the floor plan, in the room or area of the floor plan associated with a new photo, with the camera icon pointing the direction from which the photo will be viewed. Then, a prompt enables the new photo to be uploaded to the floor plan server (e.g. as a jpg file, via the web based back end interface 102 and the application layer 108). The system uploads the photo via the web based ftp. The photo is then resized in Cold Fusion by image manipulation software (e.g. cfx_imageCR3 from www.efflare.com). The location of each uploaded and resized photo is stored in the database 106 and is referenced in the photo instance of the floor plan identified in the "image" and "image thumb" fields of the database (see FIG. 4). The floor plan and photos are now in a condition to be accessed and worked with in the manner described below.

Figure 3:
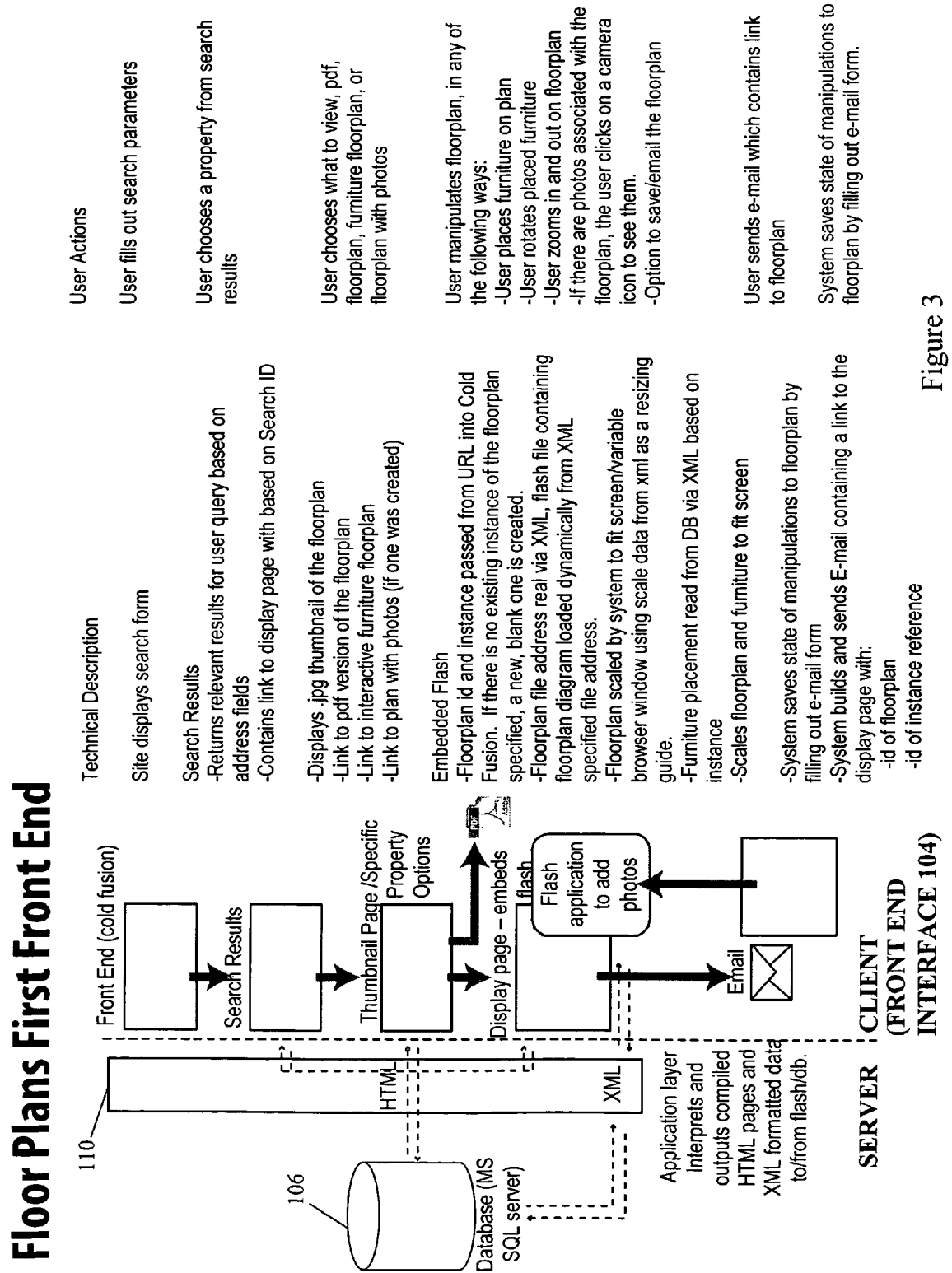
FIG. 3 is a schematic illustration of the way the principles of the present invention are implemented from the front end (user accessible side) of the floor plan server, showing the actions that can be taken by a user, and the manner in which those actions are implemented.

Referring to FIG. 3, interaction between a user and a floor plan is enabled by the front end interface 104 and the application layer 110 (via a client). The application layer 110 is constructed so that when a client is in circuit communication with the floor plan server, e.g. via a web browser over the internet, a user is enabled (via the client) to access data stored in the floor plan server database, and the client is also provided with some embedded software that can be used by the client to enable the user to work with a selected floor plan in the manner described herein.

Before describing the interactive version of a floor plan, and the interaction between a user and the floor plan server, it is believed useful to describe the manner in which furniture items are stored in the floor plan server. The furniture items are represented by one dimensional images of pieces of furniture, in a scaled relationship to the length, width and top plan shape of the actual furniture items represented by the images. In addition, when a floor plan is entered into the floor plan server database (via the back end interface 102 and the application layer 108), the scale of the floor plan is entered, and the flash file instance of the floor plan and the scale of the furniture images are then scaled to each other, in a predetermined ratio, such that when a floor plan and furniture items for that floor plan are presented to a user (via a client) the flash file of floor plan and the furniture images will always remain in a predetermined, scaled relationship. Thus, a floor plan can be entered into the floor plan server at virtually any scale, and the furniture items that can be associated with that floor plan will then be scaled so that when those furniture items are made available for insertion and manipulation with that floor plan, the furniture items will be presented in the appropriate, predetermined scaled relationship to that floor plan.

In addition, it is also believed useful to describe how an item of furniture can be rotated to a selected orientation. Basically, an item of furniture can be rotated in an incremental fashion, e.g. in increments of 15 degrees, or the furniture item can be rotated by a "click, hold and drag" function, which is the function preferred for the front end interface 104. For the click, hold and drag function, the function is selected, and the furniture rotates from it's starting position to the angle created by drawing a line from the center of the furniture to the current position of the mouse, using straight up from the x=0, y=0 position of the furniture as 0 degrees. As the mouse moves as long as the click is held down, the furniture continues to rotate to whatever line is created from the center of the furniture to the position of the mouse on screen. With the incremental rotation function, when the user clicks on the camera, the camera rotates 15 degrees clockwise from it's position at the time of click.

Referring now to FIG. 3, when a user begins to interact with the floor plan server, the user initially fills out some search parameters in a search form provided at the front end client interface 104, which enable the user to find and select a floor plan of a building the user wants to view via the front end client interface 104. Once the search results are entered, and the user has identified the building the user wants to view, the user is offered the opportunity to select the form of the floor plan the user wants to view. A jpg thumbnail of the floor plan is provided, and the user can choose among the following options: (a) linking to a pdf version of the floor plan (e.g. where the user wants only to view the floor plan or print the floor plan), (b) linking to an interactive (flash) version of the floor plan that enables the user to work with and manipulate furniture items in the floor plan, or (c) linking to a photo (flash) version of the floor plan with the location and orientation of the photos of the building (selected for presentation by the building seller/lessor) represented by camera icons on the client screen.

When a user links to an interactive version of a floor plan, the user can do any or all of the following: (a) place a selected item of furniture in a selected room in the floor plan in a predetermined orientation (by a drag and drop process), (b) rotate the item of furniture to any desired orientation in the room, and (c) transmit a link to an instance of the floor plan that contains the furniture placed there by the user, with the furniture items located and rotated to the orientations determined by the user, and which also saves that instance of the floor plan to the floor plan server database. In addition, in an interactive floor plan, the user can zoom in and out of the floor plan, and the furniture items will remain in the predetermined size ratio to the new size of the floor plan. To enable the user to perform the foregoing functions, an identifier (ID) and (for an interactive version of the floor plan) an instance of the floor plan is initially passed into Cold Fusion. If the instance of the floor plan has been previously saved, the user is taken to that instance. If no instance of the floor plan has been previously specified, a new instance of the floor plan is created. The floor plan file address (see FIG. 4) is read via XML, and a Flash file containing the floor plan is loaded dynamically from the XML specified file address. The floor plan is scaled to fit the client screen, using the scale data from XML as a resizing guide. The furniture placement and orientation is read from the database (FIG. 4) via XML based on the specified instance. The floor plan and the furniture are then scaled to fit the client screen.

If the user opens a photo version of the floor plan, the user can open a selected photo by clicking on a selected camera icon. The photo will open in a predetermined size, and the user can optionally resize the photo (e.g. the user can resize the photo to fit the entire screen of the client). In addition, the user can click and drag the photo anywhere on the client screen, without changing the floor plan (this feature is useful where the user is initially viewing a photo, and wants to view a portion of the floor plan without having to close and reopen the photo. In addition, the user can zoom in or out of the floor plan without closing a photo that is open on the floor plan.

With an interactive version of the floor plan, the user can save to the floor plan server database an instance of the floor plan (by the database format shown in FIG. 4), with the furniture items in the selected rooms in the selected rotational orientations. The user saves the instance by sending an email to an address (e.g. an internet address, URL) selected by the user which causes the instance to be saved to the database, and contains a link to the saved instance of the floor plan in the floor plan server database. Then, a subsequent user can access the saved instance of the floor plan, from a client, via the link. The subsequent user can than work with the saved instance to further modify the saved instance, and save the modified instance.

Thus, with the interactive version of the floor plan (which can be referred to as a "drag and drop" version), a buyer/renter or prospective buyer/renter can arrange a custom furniture layout on a selected floor plan, on line. The buyer/renter (prospective buyer/renter) can drag and drop furniture items onto selected rooms of a floor plan, on line. The buyer/renter can also rotate the selected furniture items to any rotational orientation in a room of the floor plan. Thus, a buyer/renter can explore furniture layout possibilities, save an instance of a floor plan with a furniture layout to work on later, email the instance to others, and print a copy of the furniture layout.

Moreover, to further explain the manner in which the interactive version operates, when a user chooses the interactive version of the floor plan, a Flash file is loaded, which in turn loads an XML file (which is generated in Cold Fusion) from data stored in the MS SQL server. The XML describes the file-address and the scale of the floor plan. The Flash loads the floor plan based on this information into the front end client interface 104. The front end client interface 104 allows the user to zoom in and out of the floor plan, drag the floor plan around the client screen, add furniture items, and rotate furniture items to selected rotational orientation(s). The floor plan instance, with the added furniture item(s), in the rotational orientation(s) produced by the user, can then be sent to an email address (which results in the floor plan instance being saved at the server, with the placement and rotational orientation of the furniture item(s) in that instance persistent (unless further modified), and the email contains a link, in URL format, to the saved floor plan instance).

In addition, to further explain the manner in which the photo version operates, when a user chooses the photo version of the floor plan, a Flash file is loaded which in turn loads an XML file that is generated in Cold Fusion from data stored in the MS SQL server. The XML describes the file-address and the scale of the floor plan. In addition, the XML describes the position of the photos and the file address of each photo jpg. The Flash then loads the floor plan, based on this information into the front end interface 104. The front end interface 104 then allows the user to zoom in and out of the floor plan (independently of the capability of the interface to allow the user to work with the photos), drag the floor plan about the client screen, drag the photos about the client screen, and view the photos by clicking on the camera icons. Also, once a photo has been opened, it can be resized by clicking on the photo (e.g. the photo can be resized to fit the entire client screen). The jpg photos are loaded at the time of the user request, not beforehand, so as to save the user time.

It is also useful to note the following aspects of the server and method of the present invention:

a. As shown in FIG. 4, certain aspects of the data base are based on a "many to one" relationship. Specifically, a floor plan instance can be related to many furniture items, thereby enabling a saved floor plan instance to be related to all of the furniture items that are selected and oriented in that floor plan as a saved instance. Also, many floor plan instances can be related to a search ID. Thus, a user is enabled to open, work with and save many instances of the same floor plan, and each saved instance can have a number of furniture items that are located, oriented, and saved as a part of that instance.

b. Applicants believe it is preferable to provide separate interactive and photo versions of a single floor plan, so that the camera icons do not clutter a floor plan with saved furniture items.

c. While the applicants' invention enables software necessary for the client to operate in the way described herein to be passed to the client, all saved instances of the floor plan (including modified instances) are located at the server, so that the client storage capabilities are not required.

d. The server 100 can be a single server member, or can be formed by a plurality of server members that enable the system to provide the features described herein.

e. The present invention allows several screens to be opened, and to remain open, simultaneously, so that a user can work with an interactive version of a floor plan in one screen, and a photo version of a floor plan in another screen.

Thus, as will be clear to those in the art, with a server and method according to the principles of the present invention;

a. A user is enabled to electrically communicate with the floor plan server via a client to select a floor plan stored at the floor plan server, electronically work with the selected floor plan to produce a modified floor plan, and save an instance of the modified floor plan at the floor plan server.

b. The user can electronically work with a selected floor plan by selecting at least one furniture item for a room of the selected floor plan, and placing the furniture item in the room in a selected orientation in the room as part of the saved instance at the floor plan server.

c. The user can rotate a selected furniture item to a selected rotational orientation in a room and to save the selected furniture item in the selected rotational orientation as part of the saved instance at the floor plan server.

d. The floor plan and all furniture items available for selection at the floor plan server are in a predetermined scaled relationship to each other at the floor plan server, such that whenever a furniture item is selected for a room of the selected floor plan, the furniture item will be in the predetermined scaled relationship to the floor plan.

e. A user can electronically transmit a link to the saved instance of the modified floor plan to an address selected by the user, enabling a subsequent user to access, via the transmitted link, the saved instance of the modified floor plan at the floor plan server. Moreover, a subsequent user is enabled to work with the modified floor plan via circuit communication between a client and the floor plan server to enable any or all of (i) production of a further modification of the modified floor plan via the client, (ii) replacement of the instance of the modified floor plan with the further modification at the floor plan server, and (iii) electronically transmit a link to the modified instance at the electronic floor plan server to an address selected by the subsequent user.

f. A user or subsequent user is enabled to format a selected floor plan to fit the entire screen of a client, and to enlarge or reduce a selected area of the floor plan, independently of the capability of the user to work with the selected floor plan.

g. With the photo version of the present invention, a user can select a floor plan that is configured such that a user is provided with a symbol of the orientation from which an image (e.g. photo, motion picture, or other data) associated with a room of the selected floor plan can be accessed and viewed, and the user can maneuver the accessed image to any location over the entire screen of a client. Moreover, a user is enabled to format the floor plan to fit the entire screen of a client, and to enlarge or reduce a selected area of the floor plan, independently of the capability of the user to maneuver a selected image over the entire screen of the client.

With the foregoing disclosure in mind, it is believed that various adaptations of a floor plan server, client and method, according to the principles of the present invention, will be apparent to those in the art.

The invention claimed is:

1. A method of enabling a user to work with a floor plan that is electronically stored at a server, comprising,
   a. establishing electronic communication between the user and the floor plan server via a client, where the user
      1. selects a two dimensional floor plan from a plurality of two dimensional floor plans stored at the floor plan server, and has the option to work with the selected floor plan in either or both of the following ways:
         a. selecting and working with an interactive version of the floor plan
         b. selecting and working with a photo version of the floor plan
      2. wherein when the user selects and works with an interactive version of the floor plan the, user
         a. electronically works with the selected two dimensional floor plan to produce an electronically modified floor plan, by adding and placing two dimensional furniture items in selected positions and orientations in relation to the selected floor plan, where two dimensional furniture items are in scaled relation to the selected floor plan, and b. saves an instance of the electronically modified two dimensional floor plan at the floor plan server, for access by a subsequent user, and
c. optionally establishes electronic communication between a subsequent user and the floor plan server, via a client where the subsequent user
d. accesses the instance of the electronically modified two dimensional floor plan stored at the floor plan server, and
e. views the saved instance of the electronically modified floor plan and can optionally electronically work with the saved instance of the electronically modified floor plan to produce a further electronically modified floor plan, by placing the two dimensional furniture items in different positions and orientations or adding and placing additional two dimensional furniture items in selected positions and orientations in relation to the floor plan, and by saving an instance of the further electronically modified floor plan at the floor plan server, for access by a subsequent user;

3. wherein when the user selects and works with a photo version of the floor plan
   a. the selected floor plan provides the user with a symbol of the orientation from which an image associated with a room of the selected floor plan can be accessed and viewed, and the user can electronically work with the selected two dimensional floor plan, in any or all of the following ways:
      i. access and view a selected image associated with a room of the selected floor plan, from the orientation associated with the symbol, along with the two-dimensional floor plan,
      ii. move the accessed image to any location over the entire screen of the client, independently of the capability of the user to adjust the size or orientation of the selected floor plan,
      iii. format the floor plan to fit the entire screen of the client, and zoom in or out of the floor plan, independently of the capability of the user to move a selected image over the entire screen of the client;
      iv, move the selected floor plan to any location over the entire screen of a client without changing the size or orientation of the selected image.

2. A method of enabling a user to work with a floor plan that is electronically stored at a server, comprising,
   a. establishing electronic communication between the user and the floor plan server via a client, where the user
      1. selects a two dimensional floor plan from a plurality of two dimensional floor plans stored at the floor plan server, and has the option to work with the selected floor plan in either or both of the following ways:
         a. selecting and working with an interactive version of the floor plan,
         b. selecting and working with a photo version of the floor plan 2. wherein when the user selects and works with an interactive version of the floor plan the user
   a. electronically works with the selected two dimensional floor plan to produce an electronically modified floor plan, by adding and placing two-dimensional furniture items in selected positions and orientations in relation to the selected, floor plan, where the two dimensional furniture items are in scaled relation to the selected floor plan and
   b. saves an instance of the electronically modified two dimensional floor plan at the floor plan server, for access by a subsequent user, and
   c. optionally establishes electronic communication between a subsequent user and the floor plan server, via a client where the subsequent user
   d. accesses the instance of the electronically modified two dimensional floor plan stored at the floor plan server, and
   e. views the saved instance of the electronically modified floor plan and can optionally electronically work with the saved instance of the electronically modified floor plan to produce a further electronically modified floor plan, by placing the two dimensional furniture items in different positions and orientations or adding and placing additional two dimensional furniture items in selected positions and orientations in relation to the floor plan, and by saving an instance of the further electronically modified floor plan at the floor plan server, for access by a subsequent user;

3 wherein when the user selects and works with a photo version of the floor plan
   a. the selected floor plan provides the user with a symbol showing the orientation from which a photo image associated with a room of the selected floor plan can be accessed and viewed, and the user can electronically work with the selected two dimensional floor plan, in any or all of the following ways:
      i. access and view a selected image associated with a room of the selected floor plan from the orientation associated with the symbol, along with the two dimensional floor plan,
      ii. move the accessed photo image to any location over the entire screen of the client, independently of the capability of the user to adjust the size or orientation of the selected floor plan,
      iii. format the floor plan to fit the entire screen of the client, and zoom in or out of the floor plan, independently of the capability of the user to move a selected image over the entire screen of the client,
      iv. move the selected floor plan to any location over the entire screen of a client without changing the size or orientation of the selected photo image.

* * * * *